United States Patent
Gong et al.

(10) Patent No.: US 9,258,780 B2
(45) Date of Patent: *Feb. 9, 2016

(54) DEVICE, SYSTEM AND METHOD OF POWER MANAGEMENT IN A WIRELESS AREA NETWORK

(71) Applicant: INTEL CORPORATION, Santa Clara, CA (US)

(72) Inventors: Michelle Gong, Sunnyvale, CA (US); Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/618,334

(22) Filed: Feb. 10, 2015

(65) Prior Publication Data

US 2015/0163746 A1 Jun. 11, 2015

Related U.S. Application Data

(63) Continuation of application No. 13/654,571, filed on Oct. 18, 2012, now Pat. No. 9,001,721, and a continuation of application No. 12/538,925, filed on Aug. 11, 2009, now abandoned.

(51) Int. Cl.
*G08C 17/00* (2006.01)
*H04J 3/00* (2006.01)
(Continued)

(52) U.S. Cl.
CPC ...... *H04W 52/0235* (2013.01); *H04W 52/0216* (2013.01); *Y02B 60/50* (2013.01)

(58) Field of Classification Search
USPC .......................................... 370/311, 336, 235
See application file for complete search history.

(56) References Cited

U.S. PATENT DOCUMENTS 6,564,074 B2  5/2003  Romans
7,542,437 B1 * 6/2009  Redi et al. .................. 370/311
(Continued)

FOREIGN PATENT DOCUMENTS

EP  0907262 A2  7/1999
JP  11-177555 A  7/1999
(Continued)

OTHER PUBLICATIONS

Office Action for Chinese Patent Application No. 201210437810.4, mailed Aug. 1, 2014, 8 pages of Office action and 10 pages of English translation.
(Continued)

*Primary Examiner* — Kiet Tang
(74) *Attorney, Agent, or Firm* — Hanley, Flight & Zimmerman, LLC.

(57) ABSTRACT

Device, system, and method of power management. In some demonstrative embodiments, a device may include a wireless communication unit to transmit to a control point of a wireless area network an information request frame identifying at least one other wireless communication device in the wireless area network, wherein the wireless communication unit is to receive from the control point a response including wakeup information defining a wakeup schedule including at least one wakeup period of the other wireless communication device, and wherein, based on the wakeup information, the wireless communication unit is to transmit a wireless transmission directly to the other wireless communication device during the wakeup period. Other embodiments are described and claimed.

2 Claims, 2 Drawing Sheets

(51) Int. Cl.
*H04B 7/00* (2006.01)
*H04W 52/02* (2009.01)

(56) References Cited

U.S. PATENT DOCUMENTS

| | | | |
|---|---|---|---|
| 8,149,750 | B2 | 4/2012 | Gong et al. |
| 2004/0190467 | A1 | 9/2004 | Liu et al. |
| 2005/0122927 | A1 | 6/2005 | Wentink |
| 2007/0226351 | A1 | 9/2007 | Fischer et al. |
| 2008/0056133 | A1* | 3/2008 | Deshpande et al. ......... 370/235 |
| 2008/0170526 | A1 | 7/2008 | Narang et al. |
| 2009/0059827 | A1 | 3/2009 | Liu et al. |
| 2009/0124301 | A1 | 5/2009 | Raissinia |
| 2009/0196212 | A1 | 8/2009 | Wentink |
| 2009/0279464 | A1 | 11/2009 | Kakani et al. |
| 2010/0220690 | A1* | 9/2010 | Majkowski et al. ......... 370/336 |
| 2011/0038290 | A1 | 2/2011 | Gong et al. |
| 2011/0182222 | A1 | 7/2011 | Patel et al. |

FOREIGN PATENT DOCUMENTS

| | | |
|---|---|---|
| JP | 2001-308777 A | 11/2001 |
| JP | 2009-165133 A | 7/2009 |
| JP | 2011-503999 A | 1/2011 |
| JP | 2011-504330 A | 2/2011 |
| KR | 10-2006-0073419 A2 | 6/2006 |
| WO | 2008/044885 A2 | 4/2008 |
| WO | 2009/062116 A1 | 5/2009 |
| WO | 2009/064113 A2 | 5/2009 |
| WO | 2011/019480 A2 | 2/2011 |
| WO | 2011/019480 A3 | 4/2011 |

OTHER PUBLICATIONS

Search Report for European Patent Application No. 12190372.8, mailed on Feb. 11, 2013, 2 pages.
Supplementary Search Report for European Patent Application No. 10808498.9, mailed on Jan. 8, 2013, 1 page.
International Search Report and Written Opinion received for PCT Patent Application No. PCT/US2010/042476, mailed on Jan. 28, 2011, 9 Pages.
Michelle X. Gong et al. "Device Power Management in a Wireless Network", U.S. Appl. No. 12/384,638, filed Apr. 7, 2009.
International Preliminary Report on Patentability for PCT/US2010/042476 mailed on Feb. 23, 2012, 6 pages.
IEEE, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, IEEE Std 802.11™ 2007, Jun. 2007, pp. 1-1184.
Office Action Received for Chinese Patent Application No. 201010260631.9, mailed on Aug. 9, 2010, 12 pages of Office Action and 7 pages of English Translation.
Office Action Received for U.S. Appl. No. 12/538,925, mailed on Aug. 16, 2012, 24 pages.
Office Action Received for U.S. Appl. No. 12/538,925, mailed on Jan. 17, 2012, 22 pages.
Search Report for EP European Patent Application No. 12190372.8, mailed on Jan. 2, 2013, 9 pages.
Search Report for EP European Patent Application No. 10808498.9, mailed on Dec. 21, 2012, 9 pages.
Office Action for Japanese Patent Application No. 2012-522890, mailed Feb. 5, 2013, 4 pages of Office Action and 2 pages of English Translation.
Office Action for Japanese Patent Application No. 2012-236586, mailed Nov. 12, 2013, 6 pages of Office Action and 3 pages of English Translation.
Office Action received for Chinese Patent Application No. 201210437810.4, mailed Mar. 17, 2015, 4 pages of Office Action and 7 pages of English translation.

* cited by examiner

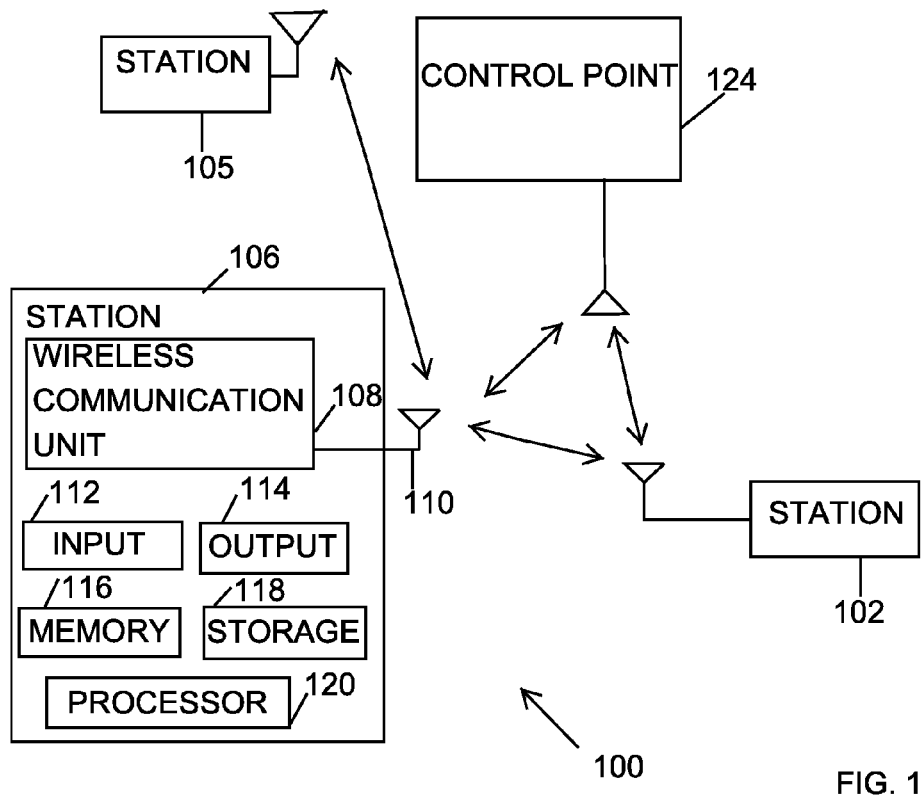
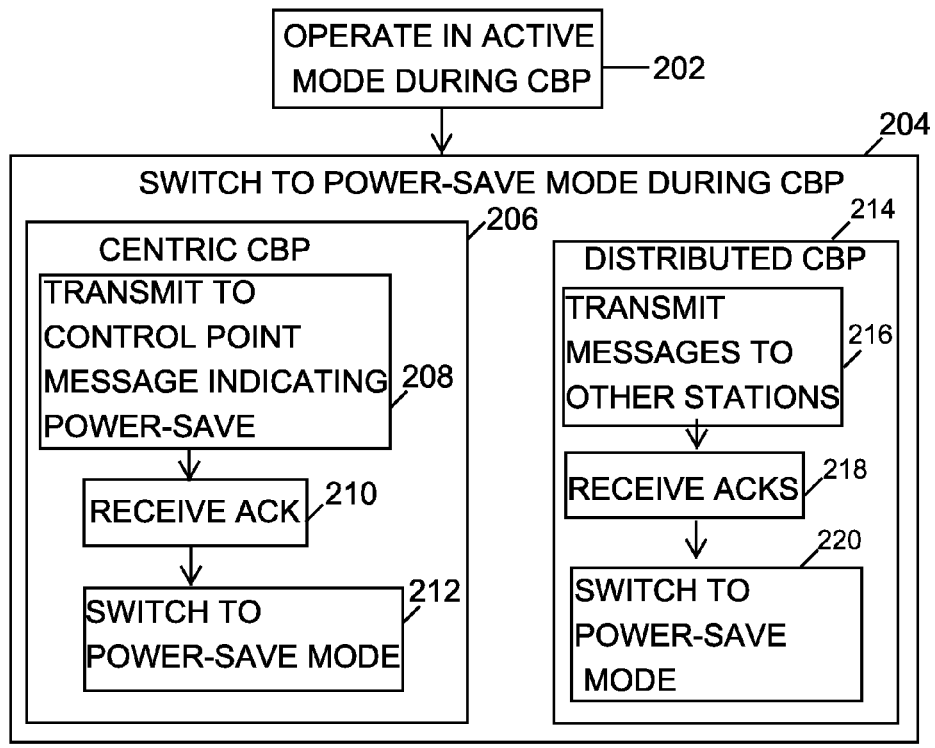
FIG. 1
FIG. 2

DEVICE, SYSTEM AND METHOD OF POWER MANAGEMENT IN A WIRELESS AREA NETWORK

CROSS-REFERENCE

This application is a continuation of U.S. patent application Ser. No. 13/654,571, filed Oct. 18, 2012, which is in turn a continuation of U.S. patent application Ser. No. 12/538,925, filed Aug. 11, 2009, and entitled "Device, System and Method of Power Management in a Wireless Area Network", which are both incorporated herein by reference.

BACKGROUND

Minimizing power consumption is an important factor in the design of wireless communication devices and/or networks in order, for example, to provide longer battery life.

A Power Management (PM) scheme may be implemented by a wireless communication network to allow one or more wireless communication devices ("stations") to conserve power, e.g., by switching from an active mode of operation to a power-save mode of operation, e.g., an "idle" or "sleep" mode of operation.

In some wireless communication networks, communication may be performed during beacon intervals. A beacon interval may include one or more Service Periods (SPs) allocated to one or more stations. Each SP is allocated to a single station, such that only the station to which the SP is allocated is allowed to communicate during the SP. The beacon interval also includes one or more Contention-Based-Period (CBP), during which the stations may be allowed to communicate using a suitable contention-based mechanism. The CBP may include a centric CBP managed by a controller or coordinator, or a distributed CBP.

A station may send a notification to inform other elements of the network of one or more beacon intervals, during which the station will be in the power-save mode. The station may be assumed to be either active during a beacon interval, including all CBPs of the beacon interval, e.g., if the station has not indicated that it will be in the power-save mode during the beacon interval; or to be in the power-save mode for the entirety of the beacon interval, e.g., if the station has indicated that it will be in the power-save mode during the beacon interval.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1 is a schematic block diagram illustration of a system in accordance with some demonstrative embodiments.

FIG. 2 is a schematic flow-chart illustration of a method of power management during a contention-based period, in accordance with some demonstrative embodiments.

DETAILED DESCRIPTION

Figure 3:
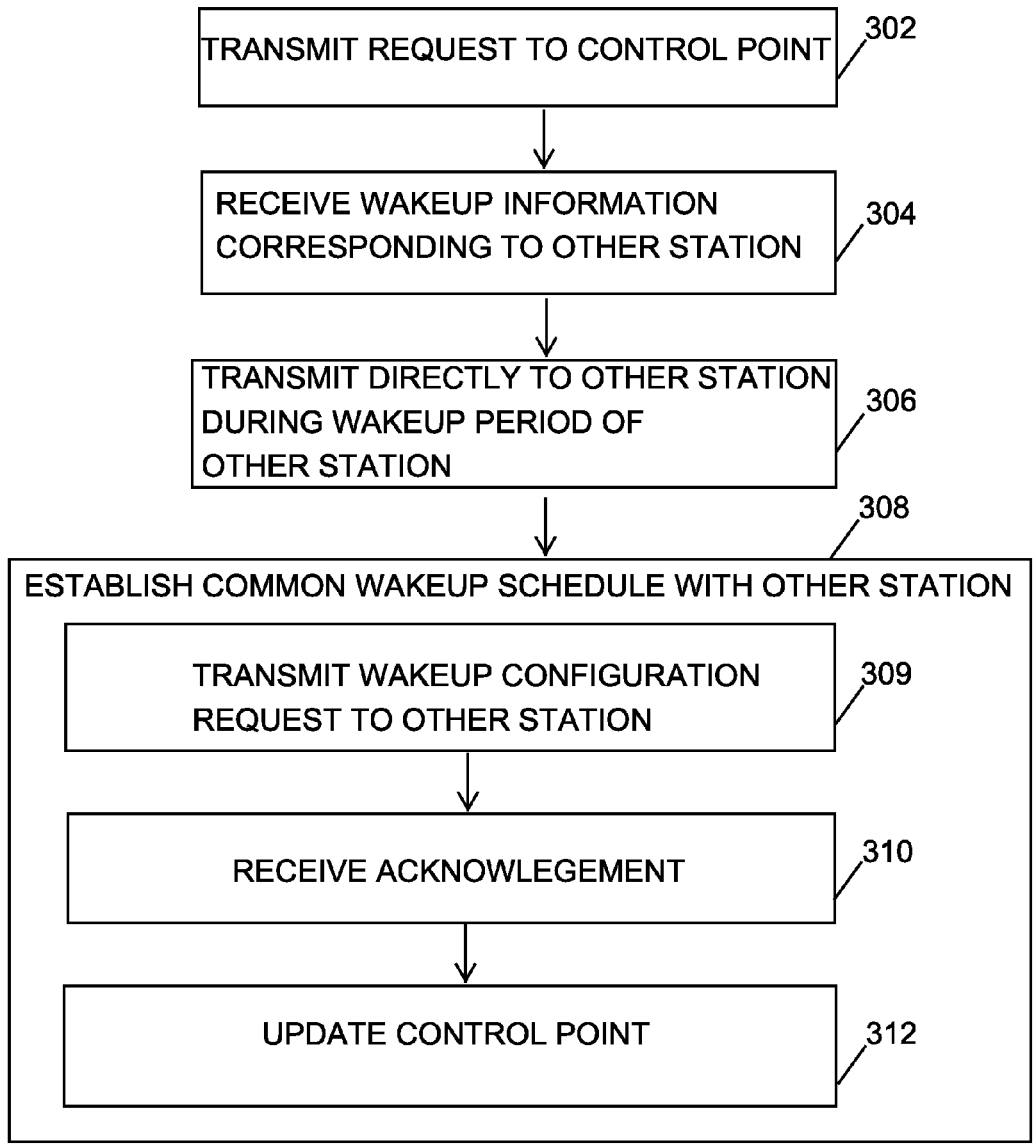
FIG. 3 is a schematic flow-chart illustration of a method of power management scheduling, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (NV) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE 802.11-1999: Wireless LAN Medium Access Control (MAC) and Physical Layer (PHY) Specifications*), 802.11a, 802.11b, 802.11g, 802.11h, 802.11j, 802.11n, 802.16, 802.16d, 802.16e, 802.16f, standards and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like.

Some demonstrative embodiments are described herein with reference to a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the IEEE 802.11 and/or WGA specifications, and the like.

Reference is now made to FIG. 1, which schematically illustrates a block diagram of a system 100 in accordance with some demonstrative embodiments.

As shown in FIG. 1, in some demonstrative embodiments, system 100 may include a wireless area network including one or more wireless communication devices capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, system 100 may include one or more stations, e.g., stations 102, 105 and 106; and a control point 124 to control and/or coordinate communications between the stations.

In some demonstrative embodiments, one of the stations of system 100 may perform the functionality of control point 124; and/or station 102, station 105 and/or station 106 may perform the functionality of control point 124.

In some demonstrative embodiments, station 102, station 105, station 106 and control point 124 may perform the functionality of a Personal-Independent-Basic-Service-Set (PBSS), a WPAN, a WVAN, a piconet, and/or any other suitable network.

In some demonstrative embodiments, control point 124 may include a suitable PBSS Control Point (PCP) or a coordinator, e.g., as defined by the IEEE 802.11 and/or WGA specifications.

In some demonstrative embodiments, station 102, station 105, station 106 and/or control point 124 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, station 106 may include a wireless communication unit 108 to communicate with station 102, station 105 and/or control point 124, e.g., as described below. Station 106 may also include, for example, one or more of a processor 120, an input unit 112, an output unit 114, a memory unit 118, and a storage unit 116. Station 106 may optionally include other suitable hardware components and/or software components. In some demonstrative embodiments, some or all of the components of station 106 may be enclosed in a common housing or packaging, and may be interconnected or operably associated using one or more wired or wireless links. In other embodiments, components of station 106 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of station 106, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, may store data processed by station 106.

In some demonstrative embodiments, wireless communication unit 108 includes, for example, one or more wireless transmitters, receivers and/or transceivers able to send and/or receive wireless communication signals, RF signals, frames, blocks, transmission streams, packets, messages, data items, and/or data. For example, wireless communication unit 108 may include or may be implemented as part of a wireless Network Interface Card (NIC), and the like.

Wireless communication unit 108 may include, or may be associated with, one or more antennas or one or more sets of antennas 110. Antennas 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, wireless communication unit 108 may be capable of communicating over the mmwave frequency band, for example, the 60 GHz frequency band. Wireless communication unit 108 may be capable of communicating over any other suitable wireless communication frequency band, in addition to or instead of the 60 GHz frequency band. In one example, wireless communication unit 108 may include a multi-band wireless communication unit capable of communicating over two or more wireless communication frequency bands, e.g., the 60 GHz frequency band and the 2.4/5 GHz frequency band.

In some demonstrative embodiments, communication between station 102, station 105, station 106 and/or control point 124 may be performed during Beacon Intervals (BIs), e.g., in accordance with the WGA specification and/or any other suitable specification. A BI may include one or more Service Periods (SPs) allocated to one or more stations. Each SP may be allocated to a single station, such that only the station to which the SP is allocated is allowed to communicate during the SP. The BI also includes one or more Contention-Based-Periods (CBPs), during which the stations may be allowed to communicate using a suitable contention-based mechanism. The CBP may include a centric CBP managed by control point 124, or a distributed contention-based-period.

In some demonstrative embodiments, station 102, 105 and/or 106 may switch between a first power-consumption ("active" or "awake") mode of operation, in which the stations may communicate over the network; and between a second, reduced, power-consumption ("power-save" or "sleep") mode of operation. A station, e.g., station 102, 105 and/or 106, may send a notification to inform other elements of the network, e.g., other stations and/or control point 124, of one or more beacon intervals, during which the station will be in the power-save mode.

In some demonstrative embodiments, a station, e.g., station 102, intending to transmit a transmission to at least one other station, e.g., station 106, at a certain time during a CBP, may be required to determine whether the other station is active or not at the certain time. For example, if station 106 has indicated to station 102 that station 102 is intending to be active during a BI, and during a CBP of the BI, station 106 switches to the power-save mode without notifying station 102, then station 102 may attempt to perform a transmission to station 106, when station 106 is in the power-save mode. If station 106 has indicated to station 102 that station 102 is intending to be in the power-save mode during a BI, and during a CBP of the BI, station 106 switches to the active mode without notifying station 102, then station 102 may avoid a transmission to station 106 during the CBP, although station 106 is active.

In some demonstrative embodiments, station 102, station 105, station 106 and/or control point 124 may implement a Power Management (PM) scheme allowing a station, e.g., station 106, to switch between the active mode and the power-save mode, even during one or more CBPs of a BI, e.g., as described in detail below.

In some demonstrative embodiments, wireless communication unit 108 may operate in the active mode to communicate with station 102, station 105 and/or control point 124 during a CBP of a BI, to switch from the active mode to the power-save mode during the CBP and/or to switch from the power-save mode to the active mode during the CBP, e.g., as described below.

In some demonstrative embodiments, the CBP may include a centric CBP managed by control point 124, e.g., in accordance with the WGA specification and/or any other suitable specification. According to these embodiments, wireless communication unit 108 may transmit, e.g., during a CBP, a message informing control point 124 that wireless communication unit 108 is to switch from the active mode to the power-save mode. The message may include, for example, a frame having a power-mode bit set to a predefined value, e.g., one. Wireless communication unit 108 may switch to the power-save mode upon receiving an acknowledgment from control point 124.

For example, wireless communication unit 108 may send a suitable frame, e.g., a Targeted-Request-To-Send (TRTS) frame or a Quality-of-Service (QoS) Null frame, to control point 124, e.g., at any time during a PCP-centric CBP. If wireless communication unit 108 is engaged in communication with control unit 124, then wireless communication unit 108 may send a TRTS frame or a data frame. The frame may include any suitable predefined power-mode bit set to a predefined value, e.g., one, indicating that wireless communication unit 108 requests to switch to the power-save mode.

In some demonstrative embodiments, upon receiving the frame with the power-mode bit set to one, control point 124 may send an acknowledgement, e.g., in the form of a Target-Clear-To-Send (TCTS) frame or an acknowledgement (ACK) frame, having the power-mode bit set to a predefined value, e.g., one. Control point 124 may send an acknowledgement to one or more, e.g., all, stations in the PBSS, including station 106. Upon receiving the acknowledgement, wireless communication unit 108 may switch to the power-save mode.

In some demonstrative embodiments, the CBP may include a distributed CBP, e.g., in accordance with the WGA specification and/or any other suitable specification. According to these embodiments, wireless communication unit 108 may transmit to other wireless communication devices of the PBSS, e.g., stations 102 and 105, one or more messages informing the wireless communication devices that wireless communication unit 108 is to switch from the active mode to the power-save mode. At least one of the messages may include, for example, a frame having a power-mode bit set to a predefined value, e.g., one. A station, e.g., station 102 and/or 105, receiving the message from wireless communication unit 108 may be notified that station 106 will be in the power-save mode; and, in response, transmit an acknowledgement to station 106. Wireless communication unit 108 may switch to the power-save mode, for example, upon receiving an acknowledgment from each of the other wireless communication devices in the PBSS.

For example, during the distributed CBP, wireless communication unit 106 may send to each station of the PBSS, e.g., stations 102 and 105, data frames and/or QoS-NULL frames with the power-mode bit set to one, to indicate that wireless communication unit 108 is to switch to the power-save mode. Wireless communication unit 108 may switch to the power-save mode, for example, upon receiving an ACK to the last data frame sent by wireless communication unit 108.

In some demonstrative embodiments, wireless communication unit 108 may send a frame having the power-mode bit set to another predefined value, e.g., zero, to indicate that wireless communication unit 108 is to be in the active mode, e.g., to switch from the power-save mode to the active mode, during the CBP. It may be assumed, for example, by stations 102 and 105 that station 106 is in the active mode during the CBP, e.g., if stations 102 and 105 do not receive a message from control point 124 or wireless communication device 108 indicating that wireless communication unit 108 is to switch to the power-save mode.

In some demonstrative embodiments, the notification sent by wireless communication unit 108 may be used to indicate any suitable predefined PM scheme during one or more CBPs.

In one example, the PM scheme may define that a station, e.g., station 106, may set the power-mode bit to one during a CBP ("the current CBP") of a BI ("the current BI") to indicate that the station is to switch to the power-save mode and remain in the power-save mode until the end of the BI, e.g., such that the station is to be in the power-save mode during the current CBP as well as any additional CBPs, if any, of the current BI. For example, if the current BI includes three CBPs, station 106 may be active during a first CBP and part of a second CBP; and station 106 may send a frame having the power-mode bit set to one during the second CBP, to indicate that station 106 is to switch to the power-save mode and remain in the power-save mode until the end of the second CBP and during the third CBP, e.g., unless station 106 sends a frame having the power-mode bit set to zero, prior to or during the third CBP.

In another example, the PM scheme may define that a station, e.g., station 106, may set the power-mode bit to one during the current CBP of the current BI to indicate that the station is to switch to the power-save mode and remain in the power-save mode until the end of the current CBP, e.g., such that the station is to be active in a next CBP, if any, of the current BI. For example, if the current BI includes three CBPs, station 106 may be active during a first CBP and part of the second CBP; and station 106 may send a frame having the power-mode bit set to one during the second CBP, to indicate that station 106 is to switch to the power-save mode and remain in the power-save mode until the end of the second CBP. Station 106 may be active during the third CBP, e.g., unless station 106 sends another frame having the power-mode bit set to one during the third CBP.

Reference is made to FIG. 2, which schematically illustrates a method of power management during a CBP, in accordance with some demonstrative embodiments. In some demonstrative embodiments, one or more operations of the method of FIG. 2 may be performed by a wireless network e.g., the PBSS of FIG. 1, a communication device, e.g., station 106 (FIG. 1), and/or a wireless communication unit, e.g., wireless communication unit 108 (FIG. 1).

As indicated at block 202, the method may include operating a wireless communication unit in an active mode to communicate with one or more other wireless communication devices in a wireless area network during a CBP of a BI. For example, wireless communication unit 108 (FIG. 1) may operate in an active mode during a CBP, e.g., as described above.

As indicated at block 204, the method may include switching the wireless communication unit from the active mode to a power-save mode during the CBP. For example, wireless communication unit 108 (FIG. 1) may switch to the power-save mode during the CBP, e.g., as described above.

As indicated at block 206, in some demonstrative embodiments, the CBP may include a centric CBP managed by a control point. For example, the CBP may include a centric CBP managed by control point 124 (FIG. 1), e.g., as described above.

As indicated at block 208, the method may include transmitting a message from the wireless communication device to the control point, wherein the message includes an indication to the control point that the wireless communication unit is to switch from the active mode to the power-save mode. For example, wireless communication unit 108 (FIG. 1) may transmit to control point 124 (FIG. 1) a frame having the power-mode bit set to one, e.g., as described above.

As indicated at block 210, the method may include receiving an acknowledgement from the control point. For example, wireless communication unit 108 (FIG. 1) may receive an ACK or TCTS frame from control point 124 (FIG. 1), e.g., as described above.

As indicated at block 212, the method may include switching the wireless communication unit to the power-save mode upon receiving the acknowledgment from the control point. For example, wireless communication unit 108 (FIG. 1) may switch to the power-save mode upon receiving the acknowledgement.

As indicated at block 214, in some demonstrative embodiments, the CBP includes a distributed CBP, e.g., as described above.

As indicated at block 216, the method may include transmitting one or more messages from the wireless communication unit to the other wireless communication devices, the messages informing the wireless communication devices that the wireless communication unit is to switch from the active mode to the power-save mode. For example, wireless communication unit 108 (FIG. 1) may transmit, e.g., during the CBP, a frame having the power-mode bit set to one to stations 102 and/or 105 (FIG. 1) and/or other stations of a PBSS.

As indicated at block 218, the method may include receiving an acknowledgment from each of the other wireless communication devices. For example, wireless communication unit 108 (FIG. 1) may receive an acknowledgement frame from stations 102 and/or 105 (FIG. 1) and/or other stations, e.g., as described above.

As indicated at block 220, the method may include switching the wireless communication unit to the power-save mode upon receiving the acknowledgment from each of the other wireless communication devices. For example, wireless communication unit 108 (FIG. 1) may switch to the power-save mode upon receiving the acknowledgements, e.g., as described above.

Referring back to FIG. 1, in some demonstrative embodiments a PBSS, e.g., including station 102, station 105, station 106 and/or control point 124, may implement a PM scheme allowing a first station, e.g., station 106, to receive information regarding an operation mode of a second station in the PBSS, e.g., station 102 and/or station 105, and/or to negotiate with the second station an active/power-save schedule ("wakeup schedule"), e.g., as described below.

In some demonstrative embodiments, wireless communication unit 108 may transmit to control point 124 an information request frame identifying at least one other wireless communication device in the PBSS, e.g., station 102. In response, wireless communication unit 108 may receive from control point 124 a response including wakeup information defining a wakeup schedule including at least one wakeup period of the other wireless communication device, e.g., during a CBP of a BI. Based on the wakeup information, wireless communication unit 108 may transmit a wireless transmission directly to the other wireless communication device during the wakeup period of the other wireless communication device.

For example, during a CBP, wireless communication unit 108 may transmit to control point 124 a frame, e.g., a TRTS, including a Target Address (TA) set to an address of station 102, which may be in the power-save mode during the CBP. In response, control point 124 may send to wireless communication unit 108 a frame, e.g., as TCTS, including a field, e.g., a duration field, set to a predefined value, e.g., zero, indicating that station 102 is in the power-save mode. The TCTS may also be received by other stations of the PBSS, e.g., station 105, thereby to inform the other stations that station 102 is in the power-save mode. Control point 124 may also send to station 106 a suitable frame, e.g., an unsolicited Information Response frame, including information, e.g., in the form of a wakeup-schedule Information Element (IE), regarding a wakeup schedule of station 102. Based on the wakeup schedule of station 102, wireless communication unit 108 may transmit a transmission directly to station 102, e.g., when station 102 will switch to the active mode of operation.

In some demonstrative embodiments, wireless communication unit 108 may establish a common wakeup schedule with at least one other wireless communication device of the PBSS, e.g., station 102. The common wakeup schedule may include at least one common wakeup period for direct communication between wireless communication unit 108 and station 102. For example, wireless communication unit 108 may transmit to the other wireless communication device a wakeup-configuration request defining the common wakeup schedule.

For example, based on the wakeup schedule IE of station 102, wireless communication unit 108 may determine a BI in which station 102 is to be active, and wireless communication unit 108 may also be active in the same BI as station 102, to initiate a data communication with station 102. In one example, wireless communication unit 108 may send a suitable frame ("the Power Save Configuration Request frame") to station 102 including information identifying a common wakeup schedule. Station 102 may accept the wakeup schedule and send back to station 106 a suitable wakeup-configuration acknowledgement frame ("the Power Save Configuration Response frame").

In some demonstrative embodiments, station 102 and/or wireless communication device 108 may transmit information defining the common wakeup schedule to control point 124. For example, upon receiving the wakeup-configuration acknowledgment from station 102, wireless communication unit 108 may transmit to control point 124 a first Power Save Configuration Request frame to update the wakeup schedule of station 106 according to the common wakeup schedule; and/or station 102 may transmit to control point 124 a second Power Save Configuration Request frame to update the wakeup schedule of station 102 according to the common wakeup schedule.

In some demonstrative embodiments, the PM scheme may allow different wakeup schedules to be defined for different links within the PBSS.

In one embodiment, wireless communication unit 108 may establish at least first and second different common wakeup schedules with at least first and second respective other wireless communication devices of the PBSS. For example, wireless communication unit 108 may establish a first common wakeup schedule with station 102 and a second, different, wakeup schedule with station 105.

In another embodiment, the common wakeup schedule defined between stations 102 and 106 may be different from a wakeup schedule defined between station 102 and control point 124 and/or a wakeup schedule defined between station 106 and control point 124.

In some demonstrative embodiments, the wakeup schedules between station 106 and control point 124 and station 102 may be based on amounts of traffic to be communicated between station 106 and control point 124 and station 102, respectively. For example, a wakeup schedule including a greater number of BIs during which station 106 is to be active may be defined for a link intended for communication of a greater amount of data. In one example, a first wakeup schedule may be defined between station 106 and control point 124, e.g., such that station 106 is active every first number of BIs, while being in the power-save mode during other BIs; and a second wakeup schedule may be defined between station 106 and station 102, e.g., such that stations 106 and 102 are active every second number of BIs, while being allowed to be in the power-save mode during other BIs. The first number of BIs may be greater than the second number of BIs, for example, if an amount of data to be communicated between station 106 and control point 124 is lesser than an amount of data to be communicated between stations 106 and 102. For example, the first wakeup schedule may define that station 106 is active every fifth BI for communication with control point 124; and the second wakeup schedule may define that station 106 is active every second BI for communication with station 102.

Reference is made to FIG. 3, which schematically illustrates a method of power management scheduling, in accordance with some demonstrative embodiments. In some demonstrative embodiments, one or more operations of the method of FIG. 3 may be performed by a wireless network e.g., the PBSS of FIG. 1, a device, e.g., station 106 (FIG. 1), and/or a wireless communication unit, e.g., wireless communication unit 108 (FIG. 1).

As indicated at block 302, the method may include transmitting an information request frame from a wireless communication device to a control point of a wireless area network, the information request frame identifying at least one destination wireless communication device of the wireless area network. For example, wireless communication unit 108 (FIG. 1) may transmit to control point 124 (FIG. 1) an information request frame identifying station 102 (FIG. 1), e.g., as described above.

As indicated at block 304, the method may include receiving from the control point a response including wakeup information defining a wakeup schedule including at least one wakeup period of the destination wireless communication device. For example, wireless communication unit 108 (FIG. 1) may receive from control point 124 (FIG. 1) information defining the wakeup schedule of station 102 (FIG. 1), e.g., as described above.

As indicated at block 306, the method may include transmitting, based on the wakeup information, a wireless transmission from the wireless communication unit directly to the destination wireless communication device during the wakeup period of the destination wireless communication device. For example, wireless communication unit 108 (FIG. 1) may transmit directly to station 102 (FIG. 1) during the wakeup period of station 102 (FIG. 1), e.g., as described above.

As indicated at block 308, the method may include establishing a common wakeup schedule between the wireless communication unit and the destination wireless communication device. The common wakeup schedule may include at least one common wakeup period for direct communication between the wireless communication unit and the destination wireless communication device. The common wakeup schedule may be, for example, different from a wakeup schedule between the wireless communication unit and the control point and/or a wakeup schedule between the destination wireless communication device and the control point, e.g., as described above.

As indicated at bock 309, establishing the common wakeup schedule may include transmitting a wakeup-configuration request to the destination wireless communication device, the wakeup-configuration request defining the common wakeup schedule. For example, wireless communication unit 108 (FIG. 1) may send to station 102 (FIG. 1) a wakeup-configuration request, e.g., as described above.

As indicated at block 310, establishing the common wakeup schedule may include receiving an acknowledgement from the destination wireless communication device. For example, wireless communication unit 108 (FIG. 1) may receive an acknowledgement from station 102 (FIG. 1), e.g., as described above.

As indicated at block 312, establishing the common wakeup schedule may include transmitting to the control point information defining the common wakeup schedule. For example, wireless communication unit 108 (FIG. 1) may transmit information defining the common wakeup schedule with station 102 (FIG. 1) to control point 124 (FIG. 1), e.g., upon receiving the wakeup-configuration acknowledgment from station 102 (FIG. 1); and/or station 102 (FIG. 1) may transmit information defining the common wakeup schedule with station 106 (FIG. 1) to control point 124 (FIG. 1), e.g., as described above.

Figure 4:
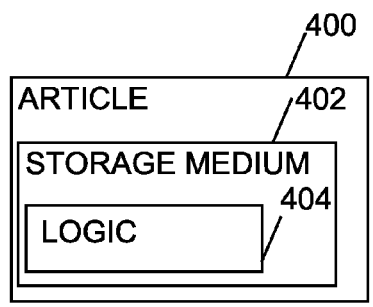
FIG. 4 is a schematic block diagram illustration of an article of manufacture, in accordance with some demonstrative embodiments.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of wireless communication unit 108 (FIG. 1), station 102 (FIG. 1), station 105 (FIG. 1), station 106 and/or control point 124 (FIG. 1); and/or to perform one or more operations of the method of FIG. 2 and/or FIG. 3.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of communicating in a wireless network, comprising:
    transmitting, to a control point of the wireless network, a request frame identifying a particular wireless communication device in the wireless network;
    receiving, from the control point, a response frame in response to the request frame, the response frame including wakeup information indicating a wakeup schedule of the particular wireless communication device;

transmitting a wireless transmission to the particular wireless communication device during a wakeup period indicated in the wakeup schedule; and operating in an active mode to communicate over the wireless network during a contention-based period of a beacon interval and switching from the active mode to a power-save mode during the contention-based period after transmitting to the control point a message containing a power-mode bit set to a 1 to indicate a request to switch from the active mode to the power-save mode and receiving from the control point an acknowledgment of the message;

wherein said transmitting to the control point and said receiving from the control point are over a 60 GHz frequency band.

2. A method of communicating in a wireless network, comprising:

transmitting a wireless transmission to a wireless communication device during a wakeup period indicated in a previously-received wakeup schedule for the wireless communication device;

operating in an active mode to communicate over the wireless network during a contention-based period of a beacon interval;

transmitting a message indicating an intent to switch from the active mode to a power-save mode, the message containing a power-mode bit set to a value of 1;

receiving an acknowledgement to the message; and switching from the active mode to the power-save mode during the contention-based period;

wherein said transmitting the message and said receiving the acknowledgement are over a 60 GHz frequency band.

* * * * *